(12) United States Patent
Riemenschneider et al.

(10) Patent No.: US 11,599,804 B2
(45) Date of Patent: Mar. 7, 2023

(54) AUTOMATED ANNOTATION OF HETEROGENEOUS CONTENT

(71) Applicants: Disney Enterprises, Inc., Burbank, CA (US); ETH Zürich, Zürich (CH)

(72) Inventors: Hayko Jochen Wilhelm Riemenschneider, Zurich (CH); Leonhard Markus Helminger, Zürich (CH); Abdelaziz Djelouah, Zürich (CH); Christopher Richard Schroers, Zürich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 412 days.

(21) Appl. No.: 16/852,003

(22) Filed: Apr. 17, 2020

(65) Prior Publication Data
US 2021/0326720 A1   Oct. 21, 2021

(51) Int. Cl.
*G06F 17/00* (2019.01)
*G06N 5/04* (2023.01)
*G06N 20/00* (2019.01)
*G06F 16/245* (2019.01)
*G06N 5/02* (2023.01)
*G06N 5/045* (2023.01)

(52) U.S. Cl.
CPC ............. *G06N 5/04* (2013.01); *G06F 16/245* (2019.01); *G06N 5/02* (2013.01); *G06N 5/045* (2013.01); *G06N 20/00* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 9,582,482 B1* | 2/2017 | Sharifi | G06F 16/5866 |
| 2008/0156636 A1* | 7/2008 | Petrarca | H01L 21/76873 |
| | | | 257/E21.585 |

(Continued)

OTHER PUBLICATIONS

"ImageNet Classification with Deep Convolutional Neural Networks," by Krizhevsky et al. (see Alex Krizhevsky, Ilya Sutskever, and Geoffrey E. Hinton, Advances in Neural Information Processing Systems 25 (NIPS 2012)).

(Continued)

*Primary Examiner* — Hung D Le
(74) *Attorney, Agent, or Firm* — Farjami & Farjami LLP

(57) ABSTRACT

A system includes a computing platform having a hardware processor, and a system memory storing a software code and a content labeling predictive model. The hardware processor is configured to execute the software code to scan a database to identify content assets stored in the database, parse metadata stored in the database to identify labels associated with the content assets, and generate a graph by creating multiple first links linking each of the content assets to its corresponding label or labels. The hardware processor is configured to further execute the software code to train, using the graph, the content labeling predictive model, to identify, using the trained content labeling predictive model, multiple second links among the content assets and the labels, and to annotate the content assets based on the second links.

20 Claims, 8 Drawing Sheets

(56) References Cited

U.S. PATENT DOCUMENTS

| | | | | |
|---|---|---|---|---|
| 2010/0325557 | A1* | 12/2010 | Sibillo | G06F 16/954 |
| | | | | 715/751 |
| 2014/0168517 | A1* | 6/2014 | Petajan | H04N 21/854 |
| | | | | 348/576 |
| 2020/0293712 | A1* | 9/2020 | Potts | G16H 10/60 |
| 2021/0326720 | A1* | 10/2021 | Riemenschneider | |
| | | | | G06N 3/0427 |

OTHER PUBLICATIONS

"Neural Architecture Search with Reinforcement Learning," by Zoph et al. (see Barret Zoph and Quoc V. Le, International Conference on Learning Representations (ICLR) 2017).

* cited by examiner

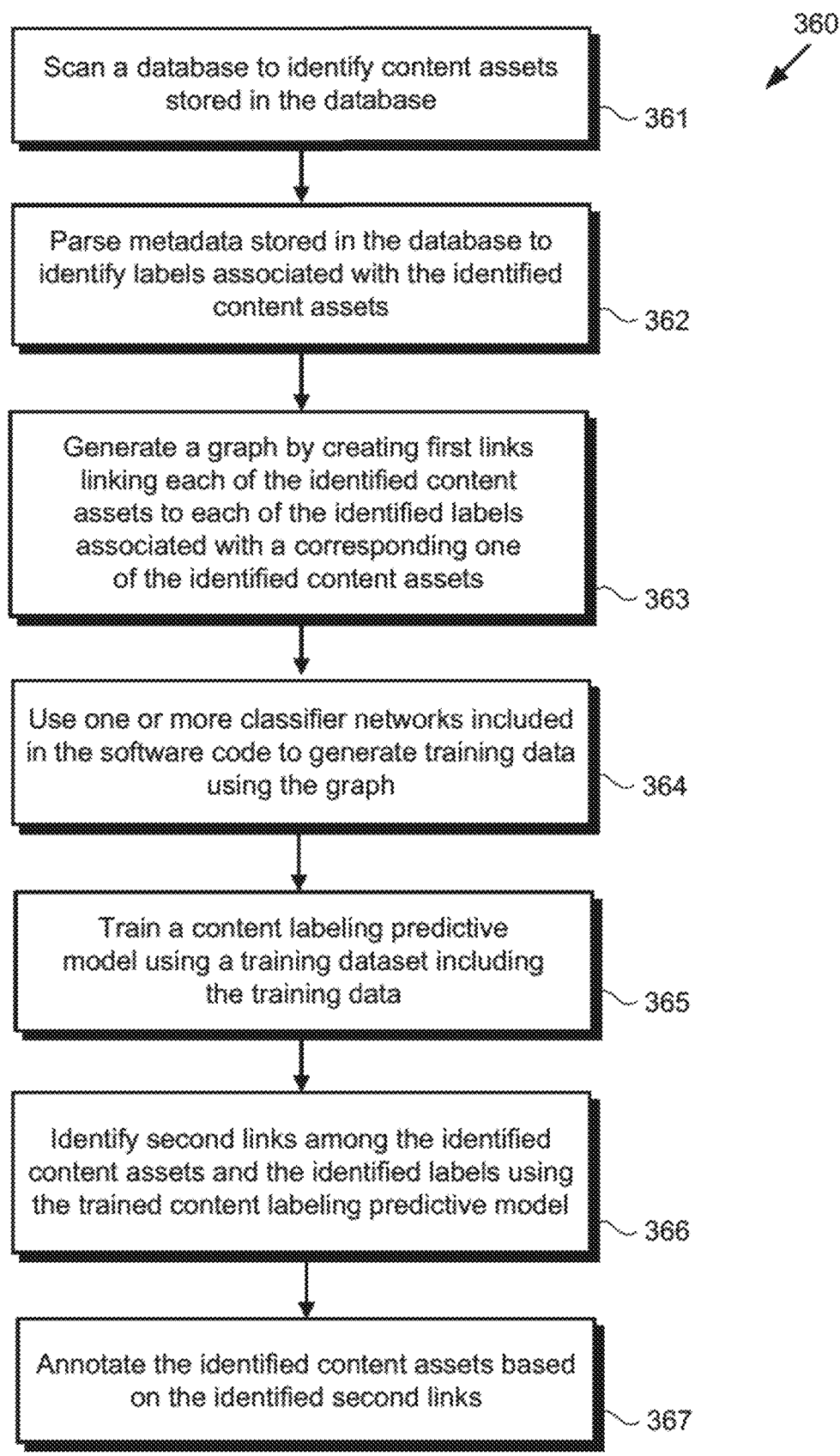

AUTOMATED ANNOTATION OF HETEROGENEOUS CONTENT

BACKGROUND

The archive of content assets saved and stored after being utilized one or a relatively few times in the course of movie production is vast, complex, and difficult or effectively impossible to search. The vastness of such an archive can easily be attributed to the sheer number of movies created over the several decades of movie making. The complexity of such an archive may be less apparent, but arises from the diversity or heterogeneity of the content collected together. For example, movie making may require the use of content assets in the form of images, both still and video, three-dimensional (3D) models, and textures, to name a few examples. Furthermore, each exemplary media type may be stored using multiple file formats, which may differ across the different media types. That is to say, for instance, video may be stored in multiple different file formats, each of which is different from the file formats used to store textures or 3D models.

Due to the heterogeneity of the archived content assets described above, making effective reuse of those assets poses a substantial challenge. For example, identifying archived content typically required a manual search by a human archivist. Moreover, because the archived content assets are often very sparsely labeled by metadata, the manual search may become a manual inspection of each of thousands of content assets, making the search process costly, inefficient, and in most instances completely impracticable. Consequently, content assets that could have in principle been identified and reused are completely recreated instead, imposing undesirable costs and delays on the process of movie making.

SUMMARY

There are provided systems and methods for performing automated annotation of heterogeneous content, substantially as shown in and/or described in connection with at least one of the figures, and as set forth more completely in the claims.

BRIEF DESCRIPTION OF THE DRAWINGS

FIG. 3 shows a flowchart presenting an exemplary method for use by a system to perform automated annotation of heterogeneous content, according to one implementation;

DETAILED DESCRIPTION

Figure 1:
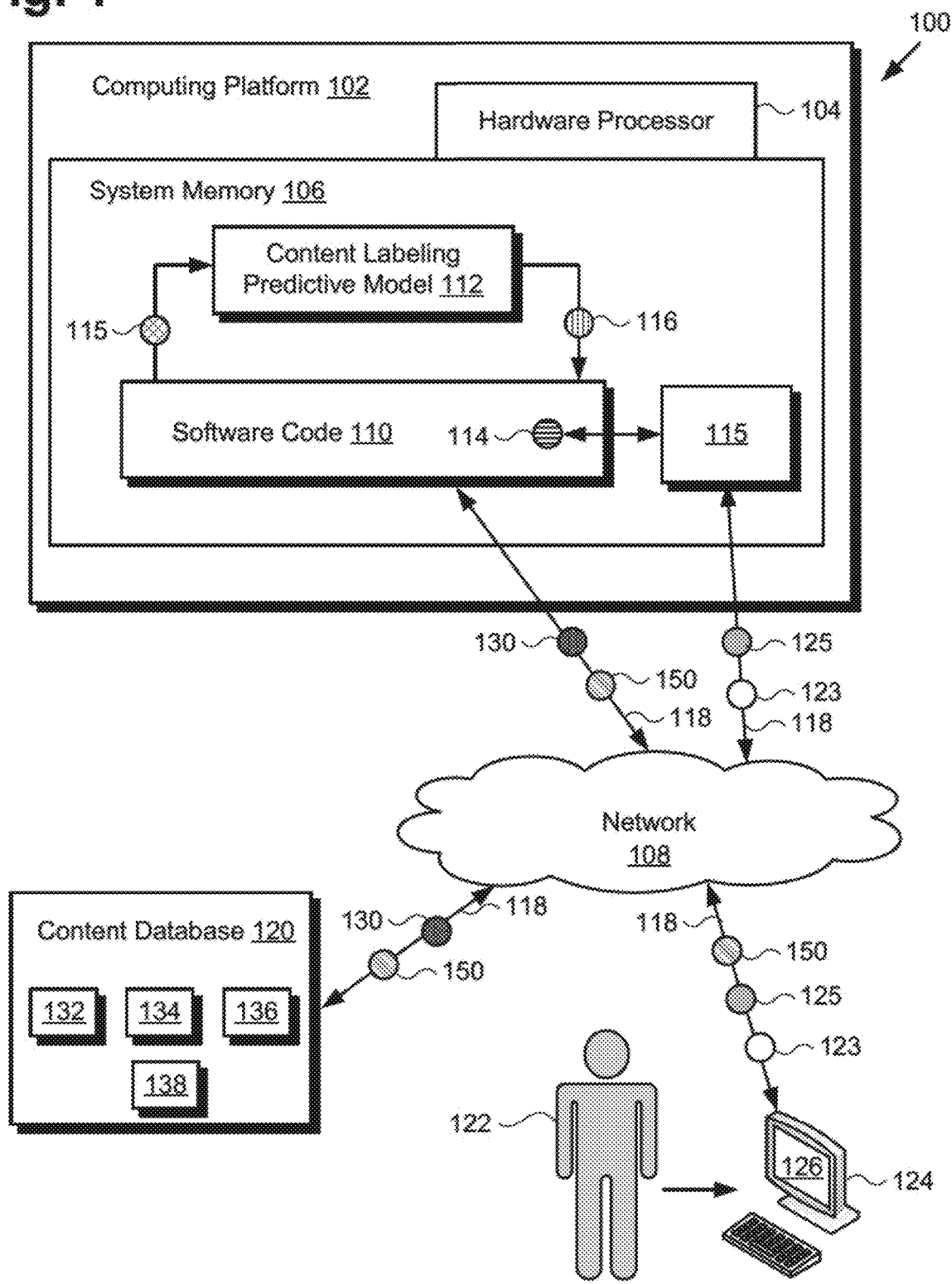
FIG. 1 shows a diagram of an exemplary system for performing automated annotation of heterogeneous content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated annotation of heterogeneous content that overcome the drawbacks and deficiencies in the conventional art. It is noted that, as used in the present application, the terms "automation," "automated", and "automating" refer to systems and processes that do not require the participation of a human user, such as a system operator. Although, in some implementations, a human system operator may review the performance of the automated systems described herein, that human involvement is optional. Thus, the methods described in the present application may be performed under the control of hardware processing components of the disclosed automated systems.

As defined in the present application, the term "heterogeneous content" refers to content representing a variety of different media types and/or content stored in a variety of different file formats. For instance, a collection of heterogeneous content may include images such as video and/or digital photographs, as well as three-dimensional (3D) models, textures and/or materials, and text files, to name a few exemplary media types. Moreover, each distinct type of media may be stored in multiple different file formats. For example, image files may be stored using one or more of Joint Photographic Experts Group (JPEG), Tagged Image File Format (TIFF), or Motion Picture Experts Group (MPEG) file formats, to name a few. By contrast, 3D models may be stored using the STereoLithography (STL) or COLLAborative Design Activity (COLLADA) file formats, for example. Textures are typically stored using the DirectDraw Surface (DDS) file format, while Material files have their own specific format. Text files may be stored in a variety of formats including as a plain text file, using rich file format, using a proprietary word processing format, or as a Portable Document Format (PDF) file, for example.

It is also noted that although the present concepts confer exceptional advantages over conventional solutions when applied to heterogeneous and unstructured collections of content assets, those same concepts can be used to optimize automated annotation of substantially homogeneous content collections, i.e., content having the same media type and/or being stored in the same file format, as well as to structured collections of content assets in which the content assets are labeled.

Moreover, as defined in the present application, a predictive model is a type of machine learning framework in which patterns or learned representations of observed data are processed. Such a predictive model may include one or more neural networks, or NNs, for example in which those patterns or learned representations of observed data are processed using highly connected computational layers that map the relationship between inputs and outputs. A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. Various forms of NNs may be used to make predictions about new data based on past examples or "training dataset." In various implementations, NNs may be trained as classifiers and may be utilized to perform image processing or natural-language processing.

FIG. 1 shows a diagram of exemplary system 100 for performing automated annotation of heterogeneous content, according to one implementation. As discussed below, system 100 may be implemented using a computer server accessible over a local area network (LAN) or may be implemented as a cloud-based system. As shown in FIG. 1, system 100 includes computing platform 102 having hardware processor 104, and system memory 106 implemented as a non-transitory storage device. According to the present exemplary implementation, system memory 106 stores software code 110 including graph 114, content labeling predictive model 112, and search engine 115.

As further shown in FIG. 1, system 100 is implemented within a use environment including communication network 108, content database 120, user system 124 including display 126, and user 122 utilizing user system 124. In addition, FIG. 1 shows network communication links 118 interactively connecting content database 120 and user system 124 to system 100 via communication network 108, as well as metadata 130 parsed from content database 120, and annotations 150 for annotating content assets 132, 134, 136, and 138 stored in content database 120. Also shown in FIG. 1 is training dataset 115 produced by software code 110 and used to train content labeling predictive model 112, new links 116 identified by content labeling predictive model 112, search term 123 provided as input to system 100 by user 122, and search result 125 output by search engine 115.

By way of overview, user 122 may utilize user system 124 to communicate with system 100 and request that system 100 annotate content assets stored on content database 120. Cn response to such a request, system 100 may scan content database 120 to identify content assets 132, 134, 136, and 138. System 100 may further parse metadata 130 stored in database 120 to identify labels associated with content assets 132, 134, 136, and 138, and may generate a graph (not shown in FIG. 1) by creating links (hereinafter "first links") linking each one of content assets 132, 134, 136, 138 to its associated label or labels identified in metadata 130. The graph is used to generate training data included in training dataset 115 for training content labeling predictive model 112, which is in turn used to identify new links 116 (hereinafter "second links 116") among content assets 132, 134, 136, and 138 and the labels included in metadata 130. Content assets 132, 134, 136, and 138 may then be annotated using annotations 150 based on identified second links 116.

Moreover, the graph based upon which training dataset 115 is produced may be updated and content labeling predictive model 112 may be retrained based on that updated graph in a recursive process. That is to say, the second links identified by content labeling predictive model 112 may be used to update the original graph, the updated graph may be used to generate additional training data for inclusion in training dataset 115, and updated training dataset 115 can be used to retrain content labeling predictive model 112, which may be used to identify additional new links among content assets 132, 134, 136, and 138. That process of graph updating, retraining, and identifying new links may be repeated as many times as necessary or desired to annotate content assets 132, 134, 136, and 138.

User 122 may also utilize user system 124 to communicate with system 100 to search for content. For example, hardware processor 104 may execute search engine 115 to receive search term 123 as an input from user 122, may traverse graph 114 to discover content corresponding to search term 123, and may output search result 125 identifying the content corresponding to search term 123.

It is noted that, although the present application refers to software code 110 and content labeling predictive model 112 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, content labeling predictive model 112, and search engine 115 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within system 100. Thus, it is to be understood that software code 110, content labeling predictive model 112, and search engine 115 may be stored and/or executed using the distributed memory and/or processor resources of system 100. Computing platform 102 may correspond to one or more web servers, accessible over a packet-switched network such as the Internet, for example. Alternatively, computing platform 102 may correspond to one or more computer servers supporting a wide area network (WAN), a LAN, or included in another type of limited distribution or private network.

Although user system 124 is shown as a desktop computer in FIG. 1, that representation is also provided merely as an example. Mow generally, user system 124 may be any suitable mobile or stationary computing device or system that implements data processing capabilities sufficient to provide a user interface, support connections to communication network 108, and implement the functionality ascribed to user system 124 herein. For example, in other implementations, user system 124 may take the form of a laptop computer, tablet computer, or smartphone, for example. Moreover, in some implementations, user system 124 may simply be a dumb terminal component of system 100 under the control of hardware processor 104.

It is noted that, in various implementations, annotations 150, when generated using software code 110, may be stored in system memory 106 and/or may be copied to non-volatile storage. Alternatively, or in addition, as shown in FIG. 1, in some implementations, annotations 150 may be used to annotate content assets 132, 134, 136, and 138, and/or may be sent to user system 124 including display 126, for example by being transferred via network communication links 118 of communication network 108.

With respect to display 126 of user system 124, display 126 may be physically integrated with user system 124 or may be communicatively coupled to but physically separate from user system 124. For example, where user system 124 is implemented as a smartphone, laptop computer, or tablet computer, display 126 will typically be integrated with user system 124. By contrast, where user system 124 is implemented as a desktop computer, display 126 may take the form of a monitor separate from user system 124 in the form of a computer tower.

Figure 2A:
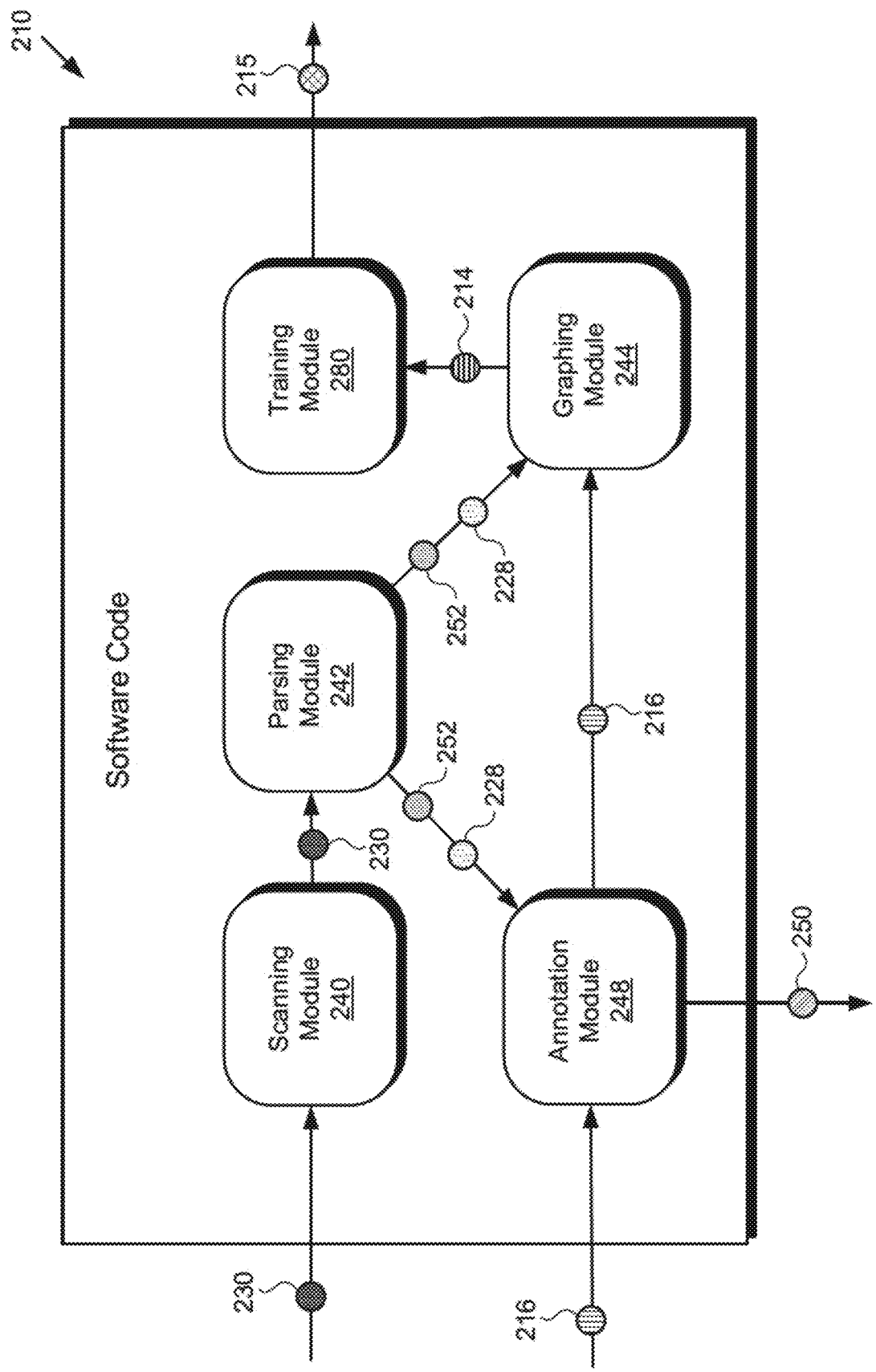
FIG. 2A shows an exemplary diagram of a software code suitable for use by the system of FIG. 1, according to one implementation.

Referring now to FIG. 2A, FIG. 2A shows an exemplary diagram of software code 210 suitable for use by system 100, in FIG. 1, according to one implementation. As shown in FIG. 2A, software code 210 is configured to receive metadata 230 and second links 216 as inputs, to generate graph 214, and to provide training dataset 215 and annotations 250 as outputs. As further shown in FIG. 2A, software code 210 includes scanning module 240, parsing module 242, graphing module 244, training module 280, and annotation module 248. Also shown in FIG. 2A are content asset identifiers 228 and labels 252 obtained from metadata 230.

Metadata 230, training dataset 215, second links 216, and annotations 250 correspond respectively in general to metadata 130, training dataset 115, second links 116, and annotations 150, in FIG. 1, and those features may share any of the characteristics attributed to either respective corresponding feature by the present disclosure. In addition, software code 210, in FIG. 2A, corresponds in general to software code 110, in FIG. 1, and those features may share any of the characteristics attributed to either corresponding feature by the present disclosure. That is to say, like software code 210, software code 110 may include features corresponding respectively to scanning module 240, parsing module 242, graphing module 244, training module 280, and annotation module 248. Moreover, graph 214 corresponds in general to graph 114, in FIG. 1. Thus, graph 114 may share any of the features attributed to corresponding graph 214 by the present disclosure, and vice versa.

Figure 2B:
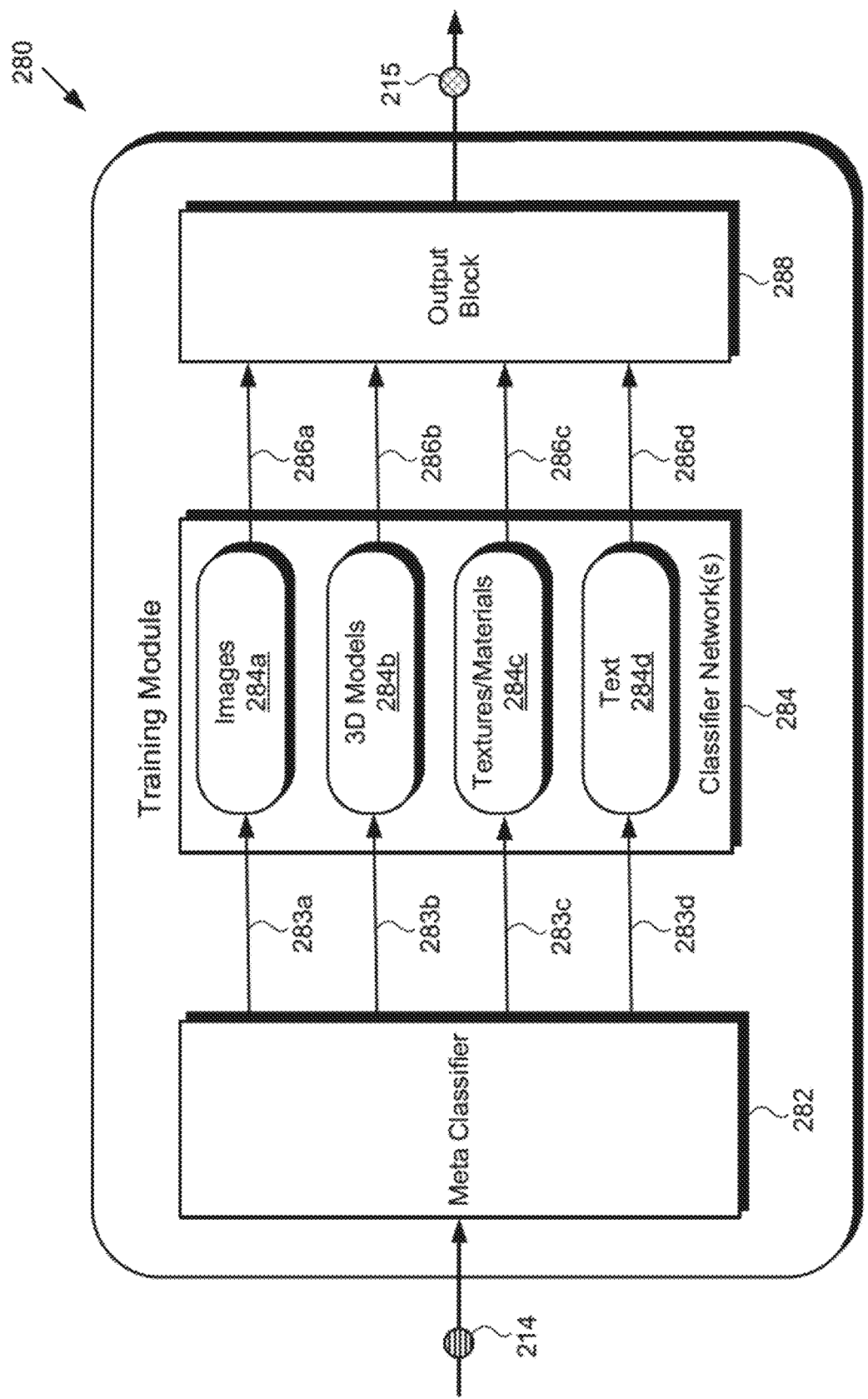
FIG. 2B shows an exemplary diagram of a training module included in the software code of FIG. 2A, according to one implementation.

FIG. 2B shows an exemplary diagram of training module 280 included in software code 110/210, according to one implementation. As shown in FIG. 2B, training module 280 is configured to receive graph 214 as an input, and to produce training dataset 215. As further shown in FIG. 2B, training module 280 includes meta classifier 282, one or more classifier networks 284 (hereinafter "classifier network(s) 284"), and output block 288.

Classifier network(s) 284 are shown to include exemplary image classifier network 284a, 3D model classifier network 284b, texture/image classifier network 284c, and text classifier network 284d (hereinafter "classifier network(s) 284a-284d"). However, it is noted that classifier network(s) 284 may include individual classifier networks other than or in addition to exemplary classifier network(s) 284a-284d. Moreover, it is noted that although classifier network(s) 284 include at least one classifier network, in some implementations, classifier network(s) 284 may contain more, or many more, than the four classifier networks shown in FIG. 2B. Also shown in FIG. 2B are graph data 283a, 283b, 283c, and 283d (hereinafter "graph data 283a-283d") routed to respective classifier network(s) 284a-284d by meta classifier 282, and training data 286a, 286b, 286c, and 286d (hereinafter "training data 286a-286d") generated by respective classifier network(s) 284a-284d using respective graph data 283a-283d.

Figure 2C:
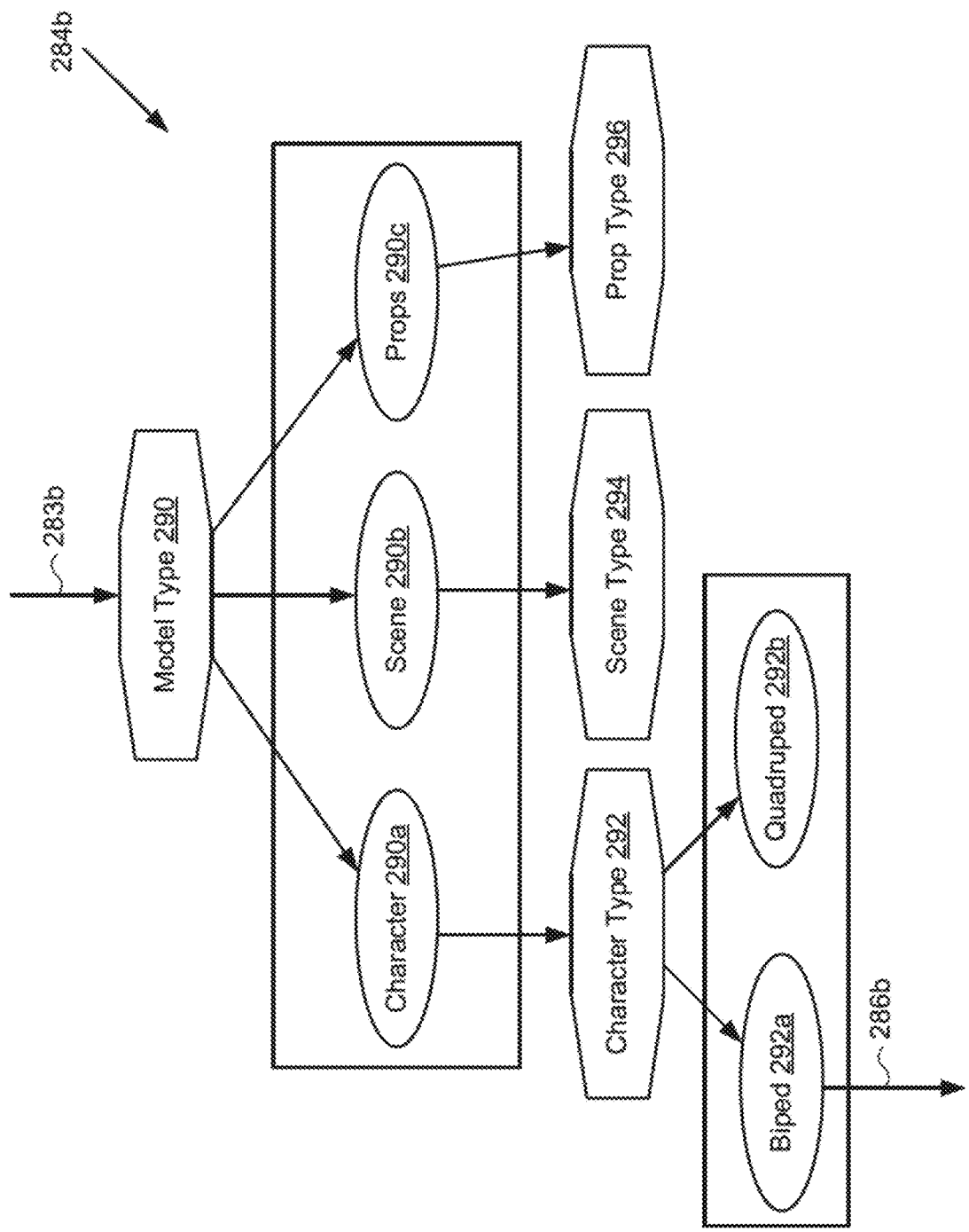
FIG. 2C shows an exemplary diagram of a classification process used to generate training data, according to one implementation.

FIG. 2C shows an exemplary diagram of a classification process performed by 3D model classifier network 284b to generate training data 286b, according to one implementation. Referring to FIGS. 2B and 2C in combination, meta classifier 282 routes graph data 283b corresponding to 3D model content assets to 3D model classifier network 284b for classification. By way of example, 3D model classifier network 284b may be configured to include model type classifier 290 to determine whether a 3D model described by graph data 283b is a 3D model of a character 290a, a model of a scene 290b, or a model of a prop 290c. Determining that the 3D model described by graph data 283b is a 3D model of a character, 3D model classifier network 284b may then use character type classifier 292 in sequence with model type classifier 290 to determine that the 3D model is biped 292a, rather than quadruped 292b, and may output that classification as training data 286b.

Although not used by 3D model classifier network 284b in the exemplary use case described above, 3D model classifier network 284b may include other classifiers, such as scene type classifier 294 and prop type classifier 296 for use cases in which the 3D model described by graph data 283b is determined to be a 3D model of a scene or props, respectively. In addition, the classifiers included in 3D model classifier network 284b may include other classifiers in addition to, or in lieu of, one or more of model type classifier 290, character type classifier 292, scene type classifier 294, and prop type classifier 296. Moreover, the multiple classifiers included in 3D model classifier network 284b may be chained together in a variety of different parallel and sequential combinations. Analogously, each of classifier network(s) 284 may include multiple classifiers arranged in a variety of parallel and sequential combinations. For example, a plurality of classifier networks may be arranged in a hierarchy of specificity, where classifiers arranged in parallel in the hierarchy are of the same level of specificity, and where classifier arranged in sequence in the hierarchy sequentially progress from lower to greater specificity in classification.

Software code 110/210 and content labeling predictive model 112 will be further described by reference to FIG. 3 in combination with FIGS. 1, 2A, and 2B. FIG. 3 shows flowchart 360 presenting an exemplary method for use by system 100 to perform automated annotation of heterogeneous content, according to one implementation. With respect to the method outlined in FIG. 3, it is noted that certain details and features have been left out of flowchart 360 in order not to obscure the discussion of the inventive features in the present application.

Referring now to FIG. 3 in combination with FIG. 1, flowchart 360 begins with scanning content database 120 to identify content assets 132, 134, 136, and 138 stored in content database 120 (action 361). In some implementations, content assets 132, 134, 136, and 138 may be a heterogeneous collection of content, for example. As noted above, heterogeneous content refers to content representing a variety of different media types and/or content stored in a variety of different file formats. Thus, content asset 132 may include one or more images such as video and/or digital photographs, content asset 134 may include one or more 3D models, and content asset 136 may include one or more textures and/or materials, while content asset 138 may include one or more text files. Moreover, each of content assets 132, 134, 136, 138 may be stored in any file format suitable to its media type. Thus, by way of example, the one or more images included in content asset 132 may be stored using the JPEG or TIFF file formats, or an MPEG file format, to name a few, 3D models included in content asset 134 may be stored using the STL or COLLADA file formats, for example, while textures included in content asset 136 are typically stored using the DDS file format, and materials may be stored as Material files. Text files included in content asset 138 may be stored in a wide variety of formats including as a plain text file, using rich file format, using any proprietary word processing format, or as a PDF file, for example.

Referring to FIG. 2A in combination with FIG. 1 and FIG. 3, scanning of content database 120 to identify content assets 132, 134, 136, and 138 may be performed by software code 110/210, executed by hardware processor 104, and using scanning module 240. Thus, software code 110/210, when executed by hardware processor 104, may be configured to use scanning module 240 to identify heterogeneous content assets 132, 134, 136, and 138 including content of a variety of different media types and/or content in a variety of different file formats. Moreover, content assets 132, 134, 136, and 138 identified in action 361 may include one or more of digital photographs, video, 3D models, textures, materials, or text files, to name a few specific examples.

Flowchart 360 continues with parsing metadata 130/230 stored in content database 120 to identify labels 252 associated with identified content assets 132, 134, 136, and 138 (action 362). By way of example, in addition to labels 252, metadata 130/230 may include content asset identifiers 228 such as filenames, directory hierarchies, and file type, as well as file type specific additional metadata. For instance, metadata 130/230 for a 3D model included in content asset 134 may include scene and object names that can be parsed out of individual 3D file formats. As another example, metadata for video included in content asset 132 may include one or more extracted key frames. Parsing of metadata 130/230 in action 362 may be performed by software code 110/210, executed by hardware processor 104, and using parsing module 242 to identify labels 252, as well as content asset identifiers 228. It is noted that when new file types are identified in action 361, a plugin can be used to configure software code 110/210 to parse the appropriate metadata.

Figure 4A:
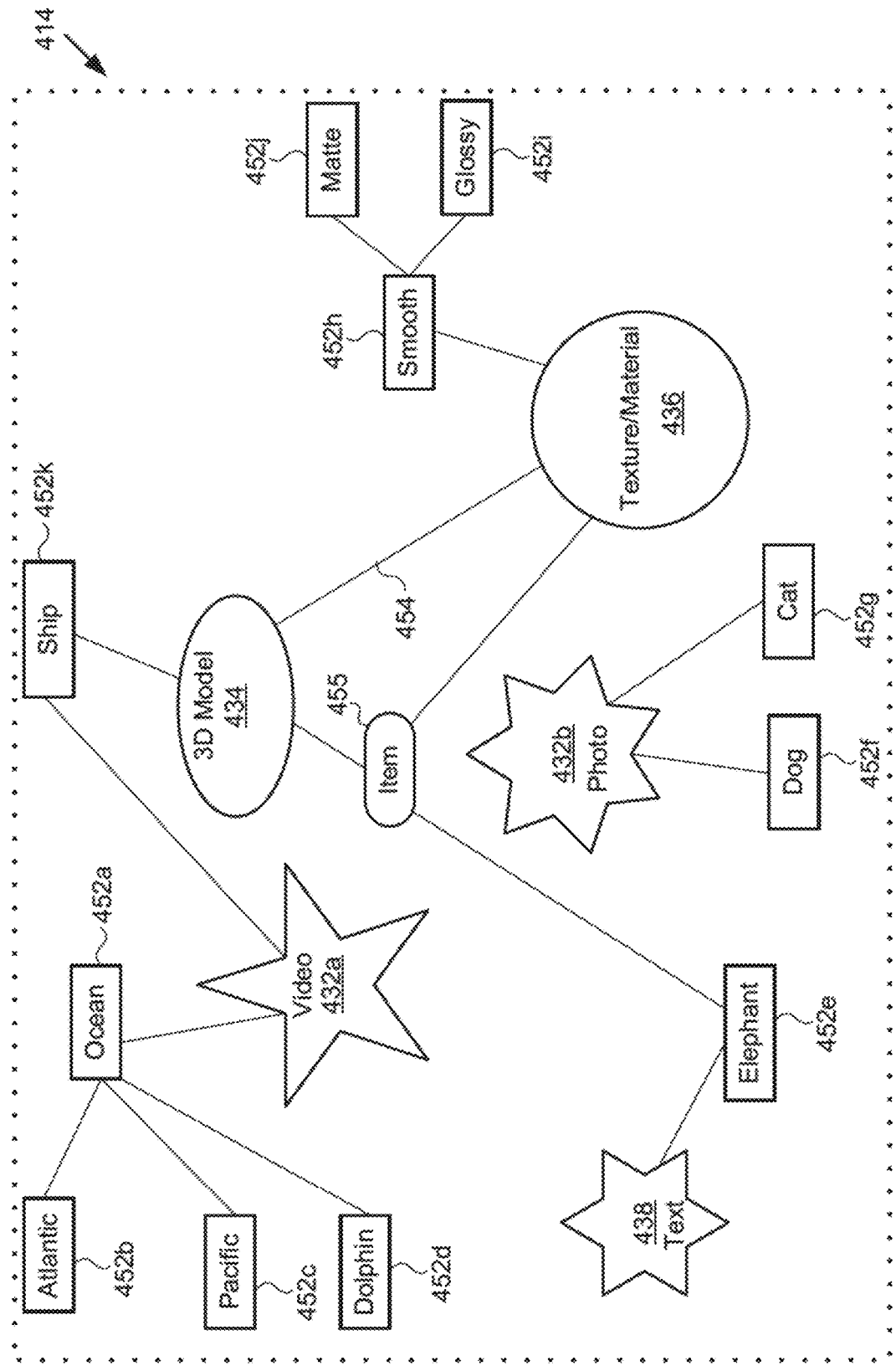
FIG. 4A shows an exemplary diagram of a graph linking content assets with their associated labels, according to one implementation.

Flowchart 360 continues with generating graph 114/214 by creating multiple first links linking each one of identified content assets 132, 134, 136, and 138 to each of identified labels 252 associated with that content asset (action 363). Referring to FIG. 4A, FIG. 4A shows an exemplary diagram of graph 414 linking video asset 432a, digital photograph asset 432b, 3D model asset 434, texture or material asset 436, and text file asset 438 (hereinafter also "content assets 432a, 432b, 434, 436, and 438") with their associated labels, according to one implementation. As shown in FIG. 4A, graph 414 includes multiple first links depicted by solid lines and represented by exemplary first link 454 (first links hereinafter referred to a "first links 454"). Also shown in FIG. 4A are labels 452a, 452b, 452c, 452d, 452e, 452f, 452g, 452h, 452i, 452j, and 452k (hereinafter "labels 452a-452k"), and an exemplary instance of content, shown in FIG. 4A as content item 455.

Graph 414 may link all of content assets 432a, 432b, 434, 436, and 438, their instances, their metadata, and their locations, for example. As shown in FIG. 4A, some of content assets 432a, 432b, 434, 436, and 438, may include a relatively rich set of first links 454 due to previous manual annotation of those content assets or because their media types inherently provide more metadata, e.g., 3D model asset 454. However other assets among content assets 432a, 432b, 434, 436, and 438, i.e., text file asset 438, may include a relatively sparse set of first links 454.

It is noted that content assets 432a, 432b, 434, 436, and 438, labels 452a-452k, and content item 455 are merely exemplary and provide an extremely simplified representation of graph 414. In a real-world use case, graph 414 would typically include thousands or tens of thousands of content assets, labels, content items, and first links. Nevertheless, referring to graph 414 merely by way of example, video asset 432a may be movie or other video content depicting features labeled ocean 452a and ship 452k, while the feature labeled ship is also linked to 3D model asset 434. The feature labeled ocean 452a is also linked to the additional features labeled Atlantic 452b, Pacific 452c, and dolphin 452d. Moreover, 3D model asset 434 to which the feature labeled ship 452k is linked, is further linked to texture or material asset 436, which itself is linked to the feature labeled smooth 452h, and through that feature to the features labeled glossy 452i and matte 452j. By way of further example, digital photograph asset 432b is linked to features labeled dog 452f and cat 452g, and text file asset 438 is linked to a feature labeled elephant 452e, while content item 455 is linked to 3D model asset 434, texture or material asset 436, and the feature elephant 452e.

Content assets 432a and 432b correspond in general to content asset 132, in FIG. 1. Consequently, content asset 132 may share any of the characteristics attributed to content assets 432a and 432b by the present disclosure, and vice versa. Content assets 434, 436, and 438 correspond respectively in general to content assets 134, 136, and 138 in FIG. 1, and those features can share any of the characteristics attributed to either respectively corresponding feature by the present disclosure. In addition, labels 452a-452k correspond in general to labels 252, in FIG. 2A. Moreover, graph 414 corresponds in general to graph 114/214 in FIGS. 1, 2A, and 2B. Thus, graph 114/214 may share any of the features attributed to corresponding graph 414 by the present disclosure, and vice versa. Generation of graph 114/214/414 including first links 454 linking each of identified content assets 432a, 432b, 434, 436, and 438 with one or more of identified labels 252/452a-452k, as well as linking content item 455 with one or more of content assets 432a, 432b, 434, 436, and 438 and labels 252/452a-452k, may be performed by software code 110/210, executed by hardware processor 104, and using graphing module 244.

Flowchart 360 continues with using classifier network(s) 284a-284d of training module 280 to generate training data 286a-286d using graph 114/214/414 (action 364). As shown in FIGS. 2A and 2B, graph 114/214/414 is received as an input by training module 280. Meta classifier 282 of training module 280 may be used to route content assets 432a, 432b, 434, 436, and 438 and their associated labels from among one or more of identified labels 252/452a-452k to the appropriate classifier network(s) 284a-284b. For example, graph data 283a including image assets 432a and 432b and their associated labels and content items may be routed to image classifier network 284a, while 3D model asset 434 and its associated labels and content items may be routed to 3D model classifier network 284b. Analogously, texture or material asset 436 and its associated labels and content items may be routed to texture/material classifier 284c, while text asset 438 and its associated labels and content items may be routed to text classifier network 284*d*.

It is noted that, although not readily apparent from FIG. 4 due to the simplicity and sparseness of exemplary graph 414, the nodes included in graph 114/214/414, i.e., content assets 432*a*, 432*b*, 434, 436, and 438, labels 252/452*a*-452*k*, and content item 455, may be grouped into clusters based on the density of linkages amongst certain nodes in an unsupervised learning process. Those clusters may then be identified and provided as graph data 283*a*-283*d* inputs to respective classifier network(s) 284*a*-284*d*. For example, a cluster including video content asset 432*a* and instances of content items 455 and labels 252/452*a*-452*k* that are densely linked to video content asset 432*a* may be used as graph data 283*a* provided as an input to image classifier network 284*a*. Analogously, a cluster including 3D model asset 432*b* and instances of content items 455 and labels 252/452*a*-452*k* that are densely linked to 3D model asset 432*b* may be used as graph data 283*b* provided as an input to 3D model classifier network 284*b*, and so forth.

Each of classifier network(s) 284*a*-284*d* may be implemented using any suitable machine learning model. In some implementations, for example, each of classifier network(s) 284*a*-284*b* may include one or more NNs. It is noted that although FIG. 2B depicts training module 280 as including four classifier networks, that representation is merely exemplary. In other implementations, training module 280 may include as few as one classifier network, or more, or many more than four classifier networks, such as dozens or hundreds of classifier networks, for example.

Each of classifier network(s) 284*a*-284*d* generates training data using graph data obtained from graph 214. That is to say, image classifier network 284*a* generates training data 286*a* using graph image data 283*a* obtained from graph 214, 3D model classifier network 284*b* generates training data 286*b* using graph 3D model data 283*b* obtained from graph 214, and so forth for texture/image classifier network 284*c* generating training data 286*c* and text classifier network 284*d* generating training data 286*d*. Training data 286*a*-286*d* output by classifier network(s) 284*a*-284*d* may be aggregated to produce training dataset 115/215 by output block 288 of training module 280.

In some implementations, as shown in FIG. 2B, classifier network(s) 284*a*-284*d* may be configured to operate in parallel to generate training data 286*a*-286*d* substantially concurrently. However, in other implementations, classifier network(s) 284*a*-284*d* may be configured to operate in sequence. In yet other implementations, some of classifier network(s) 284*a*-284*d* may be configured to operate in parallel, while others of classifier network(s) 284*a*-284*d* may be configured to operate in sequence. Action 364 may be performed by software code 110/210, executed by hardware processor 104, and using training module 280.

Flowchart 360 continues with training, using training dataset 115/215 including training data 286*a*-286*d*, content labeling predictive model 112 (action 365). Content labeling predictive model 112 may include one or more NNs for example, which may be trained using training dataset 115/215 produced based on graph 114/214/414 in a training process. One exemplary training method suitable for use to train content labeling predictive model 112 is described in the publication titled "ImageNet Classification with Deep Convolutional Neural Networks," by Krizhevsky et al. (see Alex Krizhevsky, Ilya Sutskever, and Geoffrey E. Hinton, Advances in Neural Information Processing Systems 25 (NIPS 2012)), which is hereby incorporated fully by reference into the present application. Another exemplary training method suitable for use to train content labeling predictive model 112 is described in the publication titled "Neural Architecture Search with Reinforcement Learning," by Zoph et al. (see Barret Zoph and Quoc V. Le, International Conference on Learning Representations (ICLR) 2017), which is also hereby incorporated fully by reference into the present application.

The training process initiated in action 365 enables content labeling predictive model 112 to learn which attributes and classes belong to which content assets and to propagate that new information to form new links, i.e., second links among identified content assets 432*a*, 432*b*, 434, 436, and 438 and identified labels 252/452*a*-452*k*, even in regions of graph 114/214/414 having relatively few first links 454. As a result, small numbers of initial metadata labels can advantageously be used to annotate large datasets. Training of content labeling predictive model 112 using training dataset 115/215 based on graph 114/214/414 may be performed by software code 110/210, executed by hardware processor 104, and using training module 280.

Figure 4B:
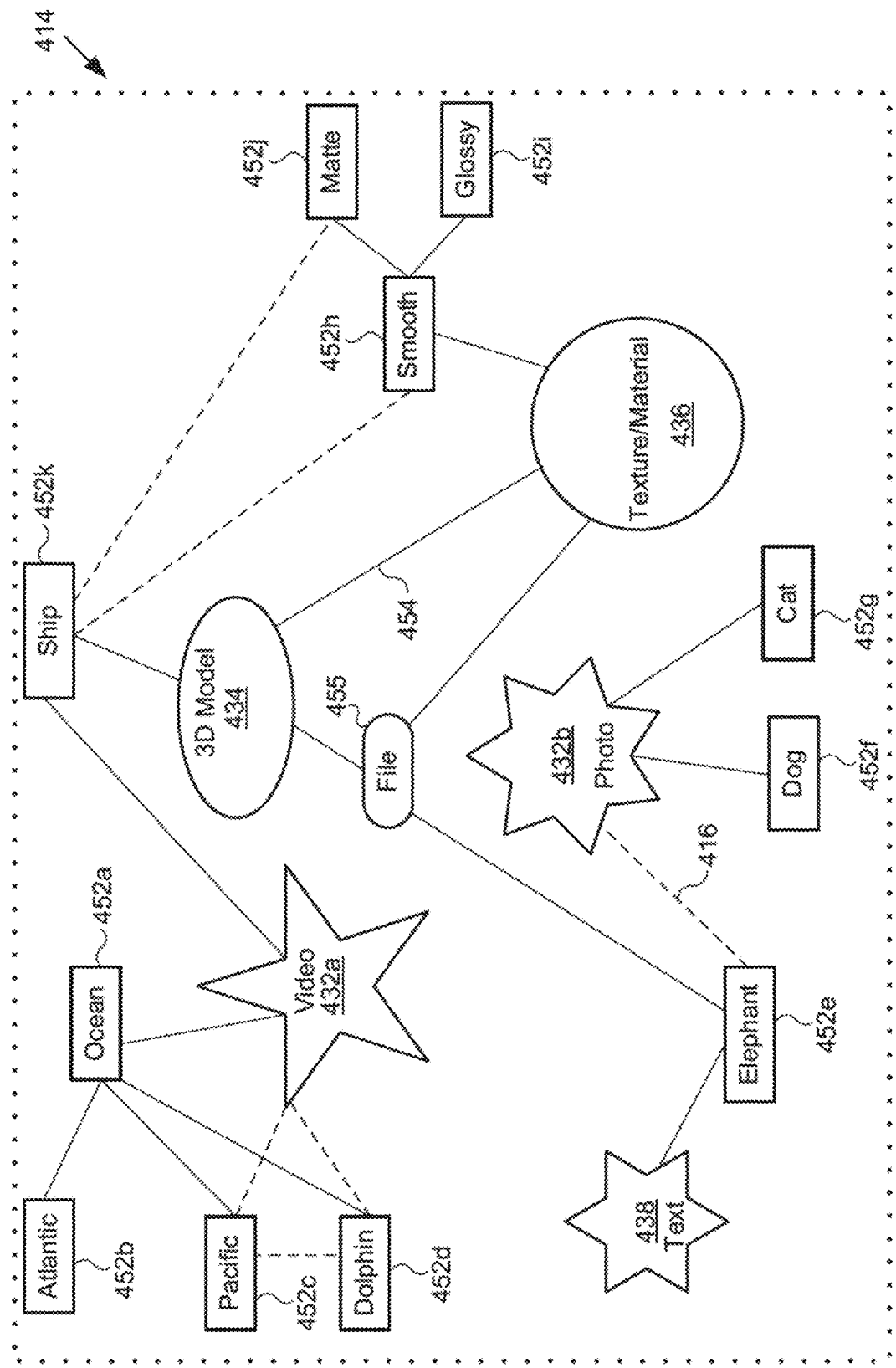
FIG. 4B shows the exemplary graph shown by FIG. 4A after being updated to include additional links identified by a content labeling predictive model trained using the graph of FIG. 4A, according to one implementation.

In some implementations, the method outlined by flowchart 360 may conclude with action 365. However, in other implementations, flowchart 360 continues with identifying, using trained content labeling predictive model 112, second links 116/216 among identified content assets 432*a*, 432*b*, 434, 436, and 438 and identified labels 252/452*a*-452*k* (action 366). Referring to FIG. 4B, FIG. 4B shows exemplary second links identified by content labeling predictive model trained using the graph of FIG. 4A, according to one implementation. It is noted that any features in FIG. 4B identified by reference numbers identical to those appearing in FIG. 4A correspond respectively to those previously described features and may share any of the characteristics attributed to them above. As shown in FIG. 4B, graph 414 is shown to include multiple second links depicted by dashed lines and represented by exemplary second links 416. It is further noted that second links 416 correspond in general to second links 116/216 in FIG. 1 and FIG. 2A. Consequently, second links 416 may share any of the characteristics attributed second links 116/216 by the present disclosure, and vice versa.

As shown in FIG. 4B, action 366 results in the identification of entirely new links among identified content assets 432*a*, 432*b*, 434, 436, and 438 and identified labels 252/452*a*-452*k*. For example, whereas digital photograph asset 432*b* was initially associated with the features labeled dog 452*f* and cat 452*g*, content labeling predictive model 112 has discovered that digital photograph also depicts the feature labeled elephant 452*e*, and has added second link 416 linking digital photograph assets 432*b* to elephant label 452*e*. Analogously, and as further shown by FIG. 4B, content labeling predictive model 112 has discovered links linking the feature labeled ship 452*k* depicted in video asset 432*a* to the texture features labeled smooth 452*h* and matte 452*j*. Moreover, content labeling predictive model 112 has discovered that the feature labeled ocean 452*a* depicted in video asset 432*a* is in fact the Pacific Ocean, and has additionally linked video asset 432*a* and the feature labeled Pacific 452*c* to the feature labeled dolphin 452*d*, which content labeling predictive model 112 has discovered is also depicted in video asset 432*a*. Action 366 may be performed through use of content labeling predictive model 112 by software code 110/210, executed by hardware processor 104.

According to the exemplary outline provided by FIG. 3, flowchart 360 can continue with annotating identified content assets 432*a*. 432*b*, 434, 436, and 438 based on identified second links 116/216/416 (action 367). Annotation of identified content assets 432a, 432b, 434, 436, and 438 may be performed by software code 110/210, executed by hardware processor 104, and using annotation module 248. For example, annotation module 248 may provide annotations 150/250 as outputs for annotating identified content assets 132, 134, 136, and 138 stored in content database 120. Referring to FIG. 4B, for instance, action 367 corresponds to annotating video asset 432a to include the labels Pacific 452c and dolphin 452d, annotating digital photograph asset 432b to include the label elephant 452e, and annotating the feature labeled ship 452k depicted in video asset 432a with the texture labels smooth 452h and matte 452j.

Figure 5:
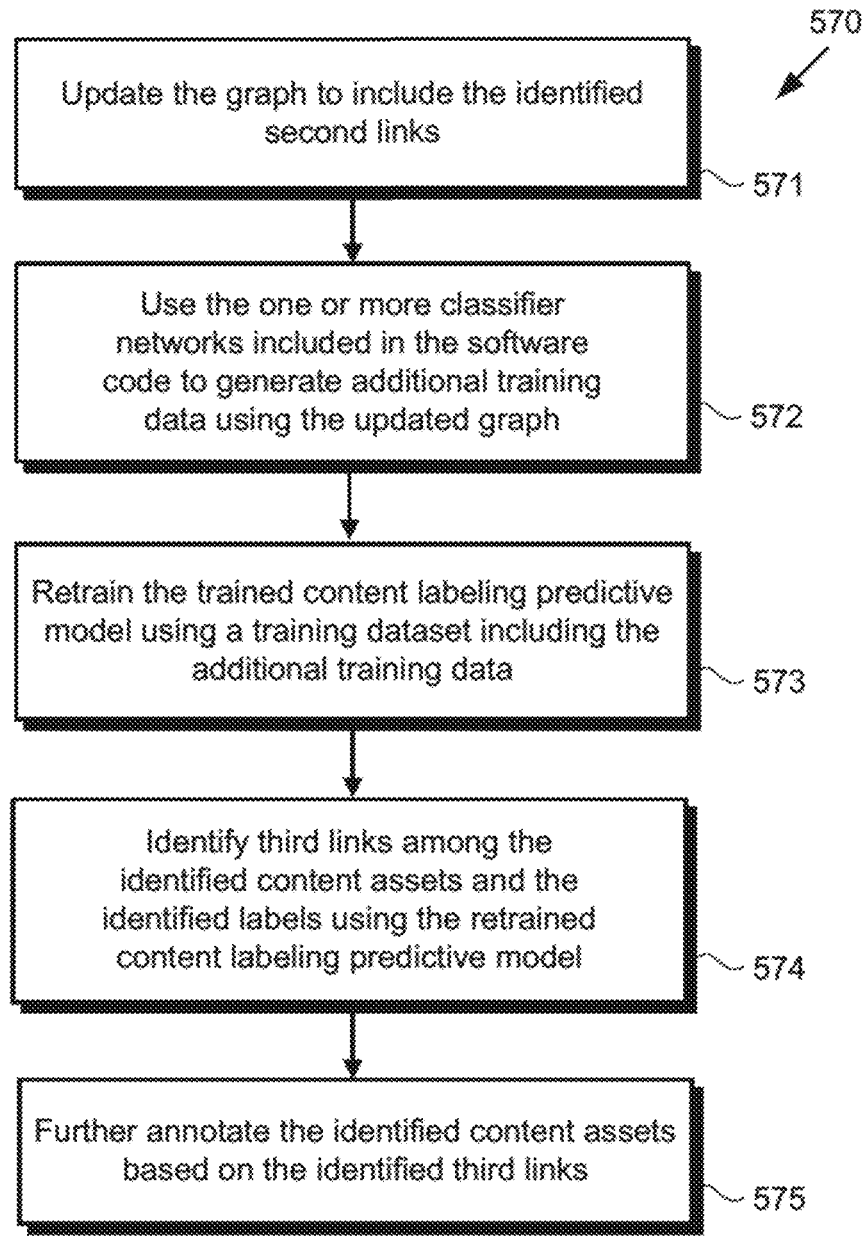
FIG. 5 shows a flowchart presenting optional actions for extending the method outlined by the flowchart in FIG. 3, according to one implementation.

As noted above, in some implementations, the method outlined by flowchart 360 can conclude with action 365, while in other implementations that method may include actions 366 and 367. In yet other implementations it may be advantageous or desirable to further train content labeling predictive model 112 based on identified second links 116/216/416. FIG. 5 shows flowchart 570 presenting optional actions for extending the method outlined in FIG. 3, according to one implementation. With respect to the method outlined in FIG. 5, it is noted that certain details and features have been left out of flowchart 570 in order not to obscure the discussion of the inventive features in the present application.

As shown in FIG. 5, flowchart 570 begins with updating graph 114/214/414 to include identified second links 116/216/416 (action 571). Referring to FIG. 4B, for example, action 571 corresponds to transforming the dashed lines of second links 416 to solid, persistent lines among identified content assets 432a, 432b, 434, 436, and 438 and identified labels 252/452a-452k. The updating of graph 114/214/414 to include identified second links 116/216/416 may be performed by software code 110/210, executed by hardware processor 104, and using graphing module 244.

Flowchart 570 continues with using classifier network(s) 284a-284d to generate additional training data using updated graph 114/214/414 (action 572). Action 572 may be performed in a manner analogous to action 364, discussed above, and may be performed by software code 110/210, executed by hardware processor 104, and using training module 280.

Flowchart 570 continues with retraining trained content labeling predictive model 112 using the training dataset including the additional training data generated in action 572 (action 573). Action 573 may be performed in a manner analogous to action 365, discussed above, and may be performed by software code 110/210, executed by hardware processor 104, and using training module 280.

Flowchart 570 continues with identifying, using retrained content labeling predictive model 112, additional links, e.g., third links, among identified content assets 432a, 432b, 434, 436, and 438 and identified labels 252/452a-452k (action 574). Action 574 may be performed in a manner analogous to action 366, discussed above. Action 574 may be performed through use of retrained content labeling predictive model 112 by software code 110/210, executed by hardware processor 104.

Flowchart 570 can conclude with further annotating identified content assets 432a, 432b. 434, 436, and 438 based on the additional links or third links identified in action 574 (action 575). Action 575 may be performed in a manner analogous to action 367, discussed above, and may be performed by software code 110/210, executed by hardware processor 104, and using annotation module 248.

It is noted that actions 571, 572, 573, 574, and 575 may be performed recursively for as many iterations as are deemed advantageous or desirable to annotate identified content assets 432a, 432b, 434, 436, and 438. That is to say, the third links used to further annotate content assets 432a, 432b, 434, 436, and 438 may be used to further update graph 114/214/414. Graph data 283a-283d from further updated graph 114/214/414 may be used by classifier network(s) 284a-284d to generate additional training data 286a-286d. Training dataset 115/215 including the additional training data may be used to retrain content labeling predictive model 112. Content labeling predictive model 112 may be used to identify further additional links among identified content assets 432a, 432b, 434, 436, and 438 and identified labels 252/452a-452k. Content assets 432a, 432b, 434, 436, and 438 may then be annotated based on the further additional links, and so forth. That is to say, graph 114/214/414 may be iteratively updated using additional links among content assets 432a, 432b, 434, 436 and labels 252/452a-452k identified by content labeling predictive model 112 after further training.

As noted above, in some implementations, user 122 may utilize user system 124 to communicate with system 100 to search for content. For example, hardware processor 104 may execute search engine 115 to receive search term(s) 123 as an input from user 122, may traverse graph 114 to discover content corresponding to search term 123, and may output search result 125 identifying the content corresponding to search term 123. The search term(s) 123 may relate to corresponding labels in the graph 114, and the search result 125 may include one or more files or instances that are highly connected to the corresponding labels in the graph 114. For example, the search term(s) 123 may include terms '3D model' and 'ship', and the search result 125 may include all of the instances linked to labels '3D model' and 'ship' in the graph 114, such as one or more animation files containing a 3D model of a ship.

In some implementations, search result 125, or annotations 150/250, may be rendered on a display, such as display 126 of user system 124, for review by user 122. In some implementations, as noted above, user system 124 including display 126 may be integrated with system 100 such that display 126 may be controlled by hardware processor 104 of computing platform 102. In other implementations, as further noted above, software code 110/210 may be stored on a computer-readable non-transitory medium, and may be accessible to the hardware processing resources of user system 124. In those various implementations, the rendering of search result 125 or annotations 150/250 on display 126 may be performed by software code 110/210, executed either by hardware processor 104 of computing platform 102, or by a hardware processor of user system 124.

Thus, the present application discloses systems and methods for performing automated annotation of heterogeneous content that overcome the drawbacks and deficiencies in the conventional art. In contrast to conventional approaches, the present annotation solution consolidates the actions of scanning, metadata parsing, predictive model training, and content annotation in an automated process flow from which human involvement may be substantially omitted. In further contrast to conventional approaches, the present annotation solution enables the analysis and annotation of large, unstructured, and heterogeneous datasets. Moreover, because the present automated annotation solution significantly increases the speed with which existing content assets can be searched, as well as reducing the cost of such a search, existing assets can advantageously be discovered and reused, rather than having to be recreated.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a system memory storing a software code and a content labeling predictive model;
the hardware processor configured to execute the software code to:
scan a database to identify a plurality of content assets stored in the database;
parse metadata stored in the database to identify a plurality of labels associated with the plurality of identified content assets;
generate graph data by creating a plurality of first links linking each one of the plurality of identified content assets to each of the plurality of identified labels associated with a corresponding one of the plurality of identified content assets;
use at least one classifier network to generate training data for the content labeling predictive model using the graph data;
train, using a training dataset including the training data generated by the at least one classifier network, the content labeling predictive model;
identify, using the trained content labeling predictive model, a plurality of second links among the plurality of identified content assets and the plurality of identified labels; and
annotate the plurality of identified content assets based on the plurality of identified second links.

2. The system of claim 1, wherein the at least one classifier network comprises a plurality of classifier networks configured to operate in parallel to generate the training data.

3. The system of claim 2, wherein one or more of the classifier networks operated in parallel further comprise one or more classifier networks chained together in sequence to generate the training data.

4. The system of claim 1, wherein the plurality of identified content assets comprises heterogeneous content assets.

5. The system of claim 1, wherein the plurality of identified content assets comprises content in a plurality of different file formats.

6. The system of claim 1, wherein the plurality of identified content assets comprises content of a plurality of different media types.

7. A system comprising:
a computing platform including a hardware processor and a system memory storing a software code and a content labeling predictive model;
the hardware processor configured to execute the software code to:
scan a database to identify a plurality of content assets stored in the database;
parse metadata stored in the database to identify a plurality of labels associated with the plurality of identified content assets;
generate graph data by creating a plurality of first links linking each one of the plurality of identified content assets to each of the plurality of identified labels associated with a corresponding one of the plurality of identified content assets;
cluster the graph data in an unsupervised learning process;
route the graph data to at least one classifier network based on the clustering;
use the at least one classifier network to generate training data for the content labeling predictive model using the graph data; and
train, using a training dataset including the training data generated by the at least one classifier network, the content labeling predictive model.

8. A method comprising:
scanning a database to identify a plurality of content assets stored in the database;
parsing metadata stored in the database to identify a plurality of labels associated with the plurality of identified content assets;
generating a graph by creating a plurality of first links linking each one of the plurality of identified content assets to each of the plurality of identified labels associated with a corresponding one of the plurality of identified content assets;
training, based on the graph, a content labeling predictive model;
identifying, using the trained content labeling predictive model, a plurality of second links among the plurality of identified content assets and the plurality of identified labels; and
annotating the plurality of identified content assets based on the plurality of identified second links.

9. The method of claim 8, further comprising:
updating the graph to include the plurality of identified second links;
retraining, based on the updated graph, the trained content labeling predictive model;
identifying, using the retrained content labeling predictive model, a plurality of third links among the plurality of identified content assets and the plurality of identified labels; and
further annotating the plurality of identified content assets based on the plurality of identified third links.

10. The method of claim 8, wherein the plurality of identified content assets comprises content in a plurality of different file formats.

11. The method of claim 8, wherein the plurality of identified content assets comprises content of a plurality of different media types.

12. A method comprising:
scanning a database to identify a plurality of content assets stored in the database;
parsing metadata stored in the database to identify a plurality of labels associated with the plurality of identified content assets;
generating a graph by creating a plurality of first links linking each one of the plurality of identified content assets to each of the plurality of identified labels associated with a corresponding one of the plurality of identified content assets;

clustering nodes of the graph in an unsupervised learning process to generate clusters of nodes;
labeling the clusters of nodes using one or more classification networks to generate cluster labels;
updating the graph by linking the clusters of nodes to the cluster labels; and
training, based on the graph, a content labeling predictive model.

13. A system comprising:
a computing platform including a hardware processor and a system memory storing a search engine and a graph of a plurality of content assets;
the hardware processor configured to execute the search engine to:
  receive a search term as an input from a user of the system;
  traverse the graph using the search term to discover a content asset corresponding to the search term, wherein the discovered content asset is one of a plurality of content assets annotated using a content labeling predictive model; and
  output a search result identifying the discovered content;
wherein the plurality of content assets are annotated by:
  scanning a database to identify the plurality of content assets stored in the database;
  parsing metadata stored in the database to identify a plurality of labels associated with the plurality of identified content assets;
  generating graph data by creating a plurality of first links linking each one of the plurality of identified content assets to each of the plurality of identified labels associated with a corresponding one of the plurality of identified content assets;
  training, based on the graph data, the content labeling predictive model;
  identifying, using the trained content labeling predictive model, a plurality of second links among the plurality of identified content assets and the plurality of identified labels; and
  annotating the plurality of identified content assets based on the plurality of identified second links.

14. The system of claim 13, wherein the graph data is provided as an input to at least one classifier network to generate training data for the content labeling predictive model.

15. The system of claim 14, wherein the at least one classifier network comprises a plurality of classifier networks arranged in a hierarchy of specificity, wherein classifier networks arranged in parallel in the hierarchy are of the same level of specificity, and wherein classifier networks arranged in sequence in the hierarchy sequentially progress from lower to greater specificity in classification.

16. The system of claim 13, wherein the graph data is iteratively updated using additional links among the plurality of content assets and the plurality of labels identified by the content labeling predictive model after training using the training data.

17. The system of claim 13, wherein the graph data is clustered in an unsupervised learning process prior to training the content labeling predictive model.

18. The system of claim 13, wherein the plurality of identified content assets comprise heterogeneous content assets.

19. The system of claim 13, wherein the plurality of content assets are further annotated by:
  Clustering, prior to the training, the graph data in an unsupervised learning process; and
  route the graph data to at least one classifier network based on the clustering.

20. The system of claim 13, wherein the plurality of content assets are further annotated by:
  clustering, prior to the training, nodes of the graph in an unsupervised learning process to generate clusters of nodes;
  labeling the clusters of nodes using one or more classification networks to generate cluster labels; and
  updating the graph by linking the clusters of nodes to the cluster labels.

* * * * *